(12) United States Patent
Simmons

(10) Patent No.: US 9,043,224 B2
(45) Date of Patent: May 26, 2015

(54) CREDIT CARD POINT OF SERVICE PAYMENT AUTHORIZATION SYSTEM

(71) Applicant: Wayne Simmons, Annapolis, MD (US)

(72) Inventor: Wayne Simmons, Annapolis, MD (US)

(73) Assignee: Securus, LLC, Annapolis, MD (US)

( * ) Notice: Subject to any disclaimer, the term of this patent is extended or adjusted under 35 U.S.C. 154(b) by 0 days.

(21) Appl. No.: 13/694,469

(22) Filed: Dec. 4, 2012

(65) Prior Publication Data

US 2014/0156424 A1     Jun. 5, 2014

Related U.S. Application Data

(60) Provisional application No. 61/630,125, filed on Dec. 5, 2011.

(51) Int. Cl.
*G06Q 20/00* (2012.01)
*G06Q 20/32* (2012.01)
*G06Q 20/40* (2012.01)

(52) U.S. Cl.
CPC ............. *G06Q 20/322* (2013.01); *G06Q 20/40* (2013.01)

(58) Field of Classification Search
CPC .......... G06Q 20/20; G06Q 30/06; G07G 1/12
USPC ............................................. 705/16
See application file for complete search history.

(56) References Cited

U.S. PATENT DOCUMENTS

| | | | |
|---|---|---|---|
| 7,100,821 B2* | 9/2006 | Rasti | 235/380 |
| 2003/0233334 A1* | 12/2003 | Smith | 705/75 |
| 2007/0011099 A1* | 1/2007 | Sheehan | 705/65 |
| 2007/0215687 A1* | 9/2007 | Waltman | 235/379 |
| 2008/0235121 A1* | 9/2008 | Gonen | 705/35 |
| 2009/0166420 A1* | 7/2009 | Phillips | 235/439 |
| 2009/0170559 A1* | 7/2009 | Phillips | 455/556.1 |
| 2009/0224033 A1* | 9/2009 | Waltman | 235/379 |
| 2009/0248538 A1* | 10/2009 | Taylor | 705/26 |
| 2010/0131397 A1* | 5/2010 | Killian et al. | 705/35 |
| 2010/0131413 A1* | 5/2010 | Kranzley et al. | 705/66 |
| 2010/0174647 A1* | 7/2010 | Kowalchyk et al. | 705/44 |
| 2010/0241563 A1* | 9/2010 | Waltman | 705/41 |
| 2012/0011063 A1* | 1/2012 | Killian et al. | 705/41 |
| 2012/0173348 A1* | 7/2012 | Yoo et al. | 705/16 |
| 2012/0221466 A1* | 8/2012 | Look | 705/39 |
| 2012/0330787 A1* | 12/2012 | Hanson et al. | 705/26.41 |
| 2013/0124423 A1* | 5/2013 | Fisher | 705/72 |

* cited by examiner

*Primary Examiner* — Seye Iwarere
(74) *Attorney, Agent, or Firm* — Remenick PLLC

(57) ABSTRACT

The risk of fraud in point of sale credit card transactions is reduced by providing independently-routed verification by communication between the authorized user of the credit card and the issuer of the credit card through a trusted intermediary.

17 Claims, 20 Drawing Sheets

Credit Card Payment & Authorization Process

Credit Card Payment & Authorization Process

Options:
1. OTP (One Time Password)
2. Digital Signature
3. Last Transaction Amount
4. Fingerprint Verification ☆ Functional components that can be implemented Home Screen Authorization Screen and Card Selection Pre Authorization Pop Up APNS Pop Up My Transactions Screen and Transaction Details

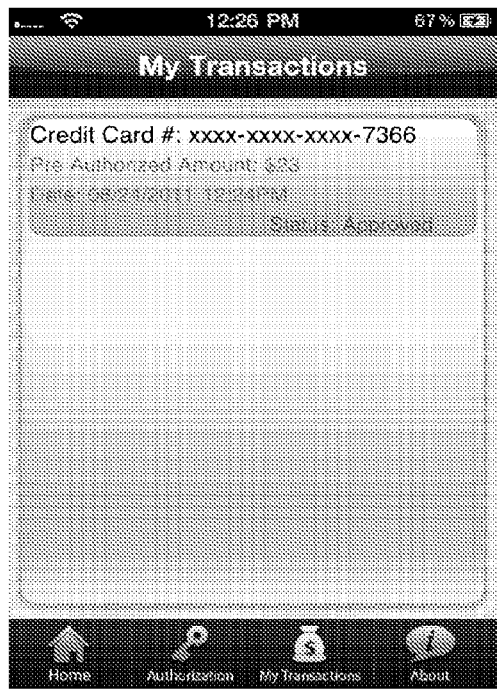

3.14. Simulation POS

1. Select the items on the screen
2. Enter the last 4 digits of the credit card number using the on screen key pad
3. Click enter button on the on screen key pad
4. POS shall send the request to CNS to BS and waits for response back
5. If time exceeds shows pass code pop up and once user enters the pass code shall send same to BS
6. Displays response from BS

FIGURE 14A

My Transaction Screen and Transaction Detail

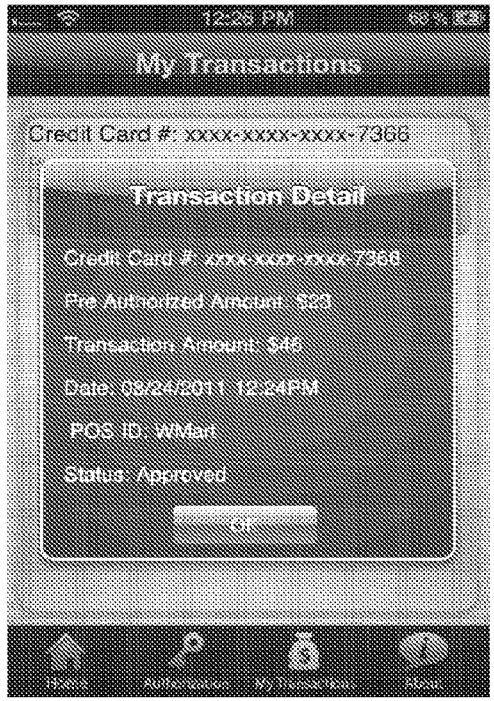

3.14. Simulation POS

7. Select the items on the screen

8. Enter the last 4 digits of the credit card number using the on screen key pad 9. Click enter button on the on screen key pad 10. POS shall send the request to CNS to BS and waits for response back 11. If time exceeds shows pass code pop up and once user enters the pass code shall send same to BS 12. Displays response from BS

FIGURE 14B 3.15. Simulation BS
   1. User logs in using proper credentials
   2. BS grid is shown with transaction details
   3. Each transaction shall have a status of authorized, declined, pending or cancelled
   4. User can log out using the logout option Login Screen

CREDIT CARD POINT OF SERVICE PAYMENT AUTHORIZATION SYSTEM

REFERENCE TO RELATED APPLICATIONS

This application claims priority to U.S. Provisional Application Ser. No. 61/630,125, filed Dec. 5, 2011 and entitled "Credit Card Point of Service Payment Authorization System," the entirety of which is incorporated by reference herein.

FIELD AND BACKGROUND OF THE INVENTION

1. Field of the Invention

The present invention relates in general to the problem of user verification and in particular to the problem of unauthorized credit card use and the reduction of the risk of fraud in point of sale credit card transactions.

2. Background Information

The invention described and claimed herein comprises a novel approach to reducing the risk of fraud in point of sale credit card transactions by providing independently-routed verification of the user's authorization by communication between the authorized user of record of the credit card and the issuer of the credit card through a trusted intermediary.

The term "credit card" is used to refer to any instrument by which an individual authorizes the request for an extension of credit or transfer of funds. It encompasses not only actual cards which are commonly referred to as "credit cards" but also debit cards and electronic "wands" and other tokens which are used to establish authority to extend credit or transfer funds.

The term "user" refers to the individual presenting the "credit card"; the term "user of record" refers to the individual who is authorized to request credit or the transfer of funds according to the records of the party extending credit or transferring funds pursuant to said request.

The term "POS" refers to a "Point of Sale" transaction.

In addition, the following abbreviations are used herein:
SRS System Requirements Specification
XML Extensible Mark-up Language
API Application Programming Interface
Ad Advertisement
CNS Credit card Network System
BS Banking system
POC Proof of Concept
BS Bank System
CNS Credit card Network service
APNS Applepush notification service
AT Actual Transaction Credit Cards are increasingly becoming popular, with an increasing customer base year on year because of the convenient and rewarding experience. Credit Card issuers offer frequent flier miles, reward points, and other rewarding perks to attract users for regular usage and to maintain their interest in using the credit card services.

Some facts & figures of credit card holders in USA:

The U.S. Census Bureau estimates that there are 181 million credit card holders in the United States. This represents approximately 77 percent of the adult population of the U.S.

According to Census Bureau estimates, there are more than 1.4 billion credit cards currently in circulation in the U.S., whose 2010 population is roughly 308.8 million.

These figures mean that there are about 4.5 credit cards for every man, woman and child in the United States, or an average of 7.7 credit cards for each of the 181 million people who actually hold credit cards.

The Federal Reserve reports that credit cards are used more than 20 billion times a year in the U.S., with the total value of these transactions at about $1.9 trillion.

Based on the number of transactions and the number of credit card holders, the average card holder uses a credit card 119 times a year, for transactions averaging $88 apiece.

This comes to an average annual total of about $10,500 in credit card purchases.

There are many players in the credit card market, but there are a handful of clear market share leaders. Based on projections from the Nilson Report based on the data collected by the U.S. Census Bureau, here is how the credit card market looked in 2010:

Three companies command 86 percent of all U.S. credit card purchase volume. Visa is the clear front-runner with an estimated 38.5 percent of annual purchase volume, followed by a close race for second and third place with MasterCard at 24.3 percent and American Express at 23.2 percent.

Other significant players in the credit card market include Discover, various store-issued credit cards, and various oil company credit cards.

Visa has the most U.S. cardholders at 111 million, followed by MasterCard at 98 million.

American Express has a much lower number of card holders, but compensates for it with an up-market focus. At 44 million U.S. cardholders, American Express not only trails Visa and MasterCard, but is edged out by Discover at 45 million. However, in terms of average annual purchase volume, American Express transactions total roughly $11,300 per card holder, compared with Visa at $7,300, MasterCard at $5,250, and Discover at $2,500.

Relative to their shares of purchase volume, Visa and MasterCard each have a disproportionate share of the debt outstanding, with Visa at 41.8 percent and MasterCard at 30.6 percent. In dollar terms, these portions of debt outstanding represent $388 billion and $284 billion, respectively.

The Mercator report estimates U.S. card issuers' total losses from credit- and debit-card fraud at $2.4 billion. That figure does not include losses that are borne by merchants, which probably run into tens of billions of dollars a year. These credit card fraud costs cardholders and credit card issuers as much as $500 million a year.

Credit Card POS losses take many forms, including:

Counterfeit Credit Card Fraud: This fraud accounts for 37% of all funds lost through credit card frauds. The fake card criminals use latest technology to skim information contained on credit cards.

Lost or Stolen Credit Card Fraud: Cards stolen from their cardholders or lost by them account for 23% of all card frauds. Often, cards are stolen from the workplace, gym, and unattended vehicles.

Identity Theft: Identity Theft has been on the rise in the recent years and can happen when criminals apply for credit card using someone else's credentials and personal information.

A 10-year low has been observed in the overall losses due to credit card frauds. According to an annual study by Javelin Strategy & Research, the number of fraud victims decreased 28 percent in 2010 from 11 million to 8.1 million. The total value of fraudulent losses also fell from $56 bn in 2009 to $37 bn in 2010. This has primarily happened because of the initiatives taken by the stakeholders of the banking industry to increase consumer awareness and hence prevent fraud.

However, billions of dollars of frauds are still happening at Point of Sale terminals because of non-involvement of the Card Holder.

Attempts to address this problem include Smart-Chip solutions, which use a card with an embedded microchip that requires the consumer to enter a unique PIN through a reader to make payment, and Near Field Communication Solutions which involve short distance wireless communication technology, which allows communication between two devices that either touch or are momentarily held close together.

The infrastructure required to enable these solutions is high and even using these solutions, fraud remains as demonstrated by the above statistics.

SUMMARY OF THE INVENTION

The foregoing problems are overcome, and other advantages are provided by an independently-routed verification of authority through communication between an authorized user and an issuer of a credit card through a trusted intermediary in accordance with the invention. It should be noted that while the preferred embodiment is illustrated with respect to a credit card transaction, the problem and the solution disclosed herein are not limited to credit cards and the invention may also be used in general to verify that a transaction is being authorized by a user of record.

The fundamental weakness of the current system is that the system does not require that the card holder be involved anywhere in the payment process—the system only requires that the person claiming to have authority produce the credit card to the POS Merchant. The solution proposed in this disclosure is to involve the Authorized User and require an approval or rejection of any payment authorizations.

It is an object of the invention to provide a means by which an Authorized User is notified of a proposed transaction and authorizes or denies authorization of the transaction via an independent communications channel.

A principal feature of the invention is the independent communications channel, controlled by a trusted intermediary.

Another principal feature of the invention is the design of the independent communications channel so that there is no direct communication between any of the parties to the transaction all communications go to a third party trusted intermediary.

Among the advantages of the invention are the reduction in risk of fraud.

Note that in the preferred embodiment, a merchant is involved only at POS, the merchant does not interact with the Bank System and a communication module runs backend around the clock, without involvement of the User or Merchant.

These and other objects, features and advantages which will be apparent from the discussion which follows are achieved, in accordance with the invention, by providing a novel tool for use in point of sale credit card transactions for reducing the risk of fraud by providing independently-routed verification by communication between the authorized user of the credit card and the issuer of the credit card through a trusted intermediary.

The various features of novelty which characterize the invention are pointed out with particularity in the claims annexed to and forming a part of this disclosure. For a better understanding of the invention, its advantages and objects, reference is made to the accompanying drawings and descriptive matter in which a preferred embodiment of the invention is illustrated.

BRIEF DESCRIPTION OF THE DRAWINGS

The foregoing and still other objects of this invention will become apparent, along with various advantages and features of novelty residing in the present embodiments, from study of the following drawings, in which:

FIGS. 8 through 19 illustrate several examples of displays which used in a prototype of the invention.

DESCRIPTION OF THE PREFERRED EMBODIMENT

The invention is illustrated through an embodiment using an Apple iPhone™. Conceptually, there are two broad approaches: a pre-authorization approach and an "at POS" authorization approach.

Figure 1:
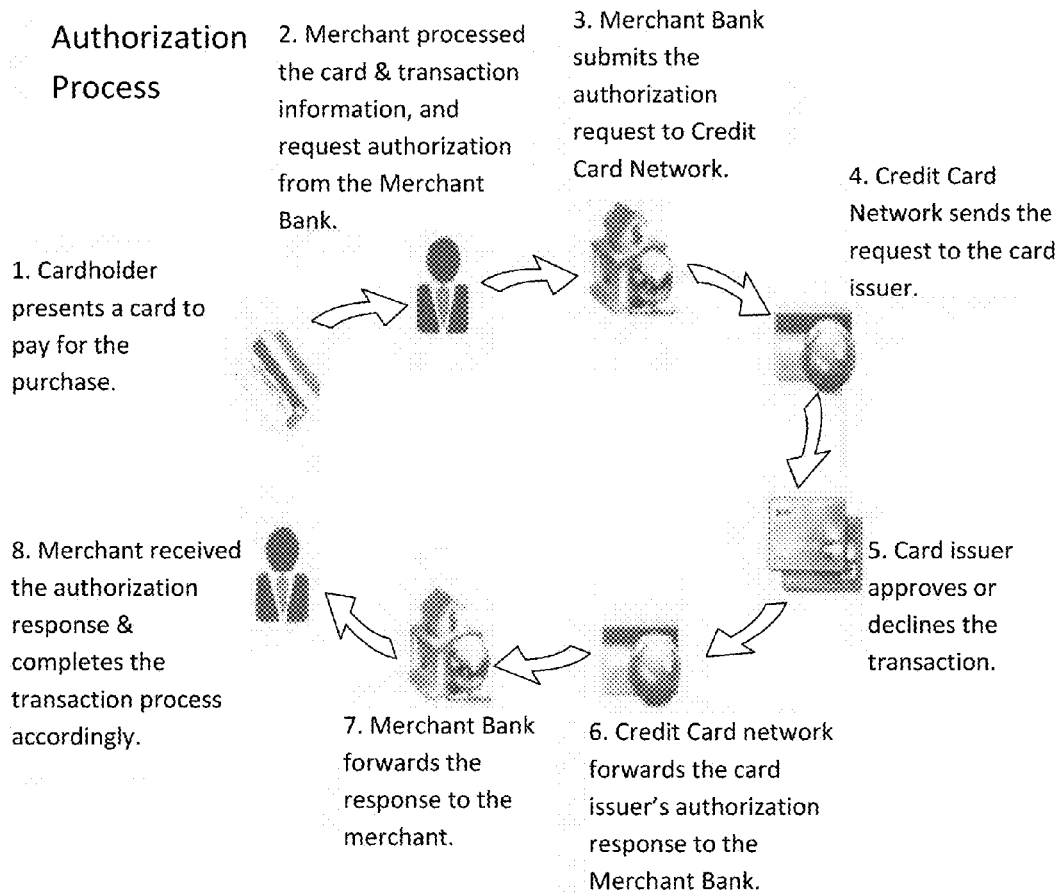
FIG. 1 is a flow chart illustrating a generalized credit card purchase authorization system.

The starting point is the current system for authorizing credit card payments, illustrated in FIG. 1. The key stakeholders in this process are Point of Sale Merchants, a Merchant Bank, Card Service Provider, the Card Holder's Bank, and a Network Provider. The stakeholder best positioned to prevent fraud is the Credit Card Holder, yet under the current system shown in FIG. 1 the card holder is not involved except for the moment when card holder hands over the credit card to the POS Merchant and therefore there is no assurance that the actual authorized user of record is actually involved in the authentication process of the credit card payment.

Figure 2:
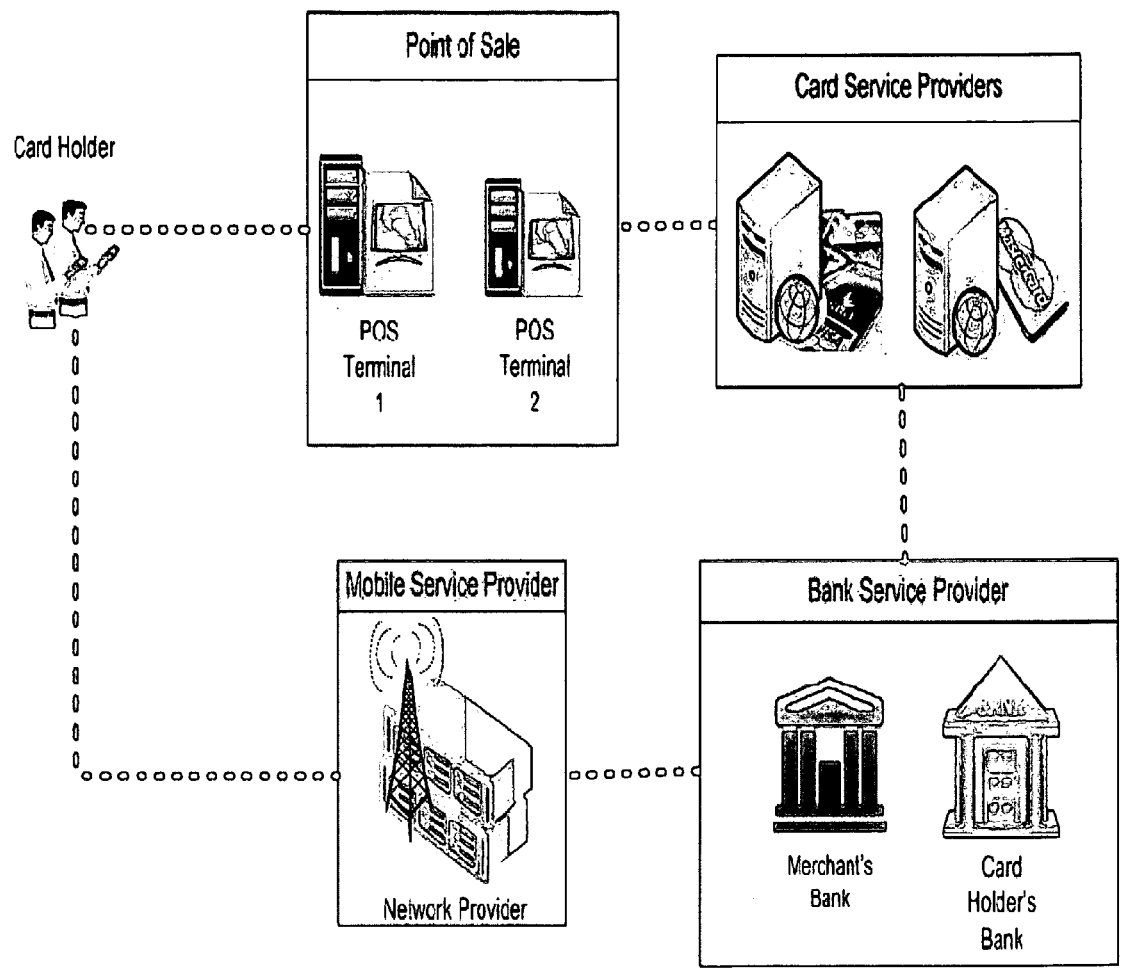
FIG. 2 illustrates the independent communication channels of the invention.

Involving the user of record in the process to authorize the payment will add a level of security and enable reduction in credit card fraud. The approach is illustrated in FIG. 2. The fundamental approach of the invention is to supply the Bank, the Credit Card Network Provider or a trusted intermediary with a user's registered mobile telephone number and to download the application described below to the user's mobile telephone. Optionally, the user may choose a pin for the application residing on their device, thereby providing an additional level of security.

Since the user's mobile number is registered with the Bank or the Network Provider or the intermediary, whenever the pre-authorization request is sent by the card holder to the bank, the user's authentication is verified.

The card holder needs to have data connectivity to use the application on their mobile device and communicate with the Bank system. In case there is no data connectivity, the user will have an option to utilize IVR.

Figure 3:
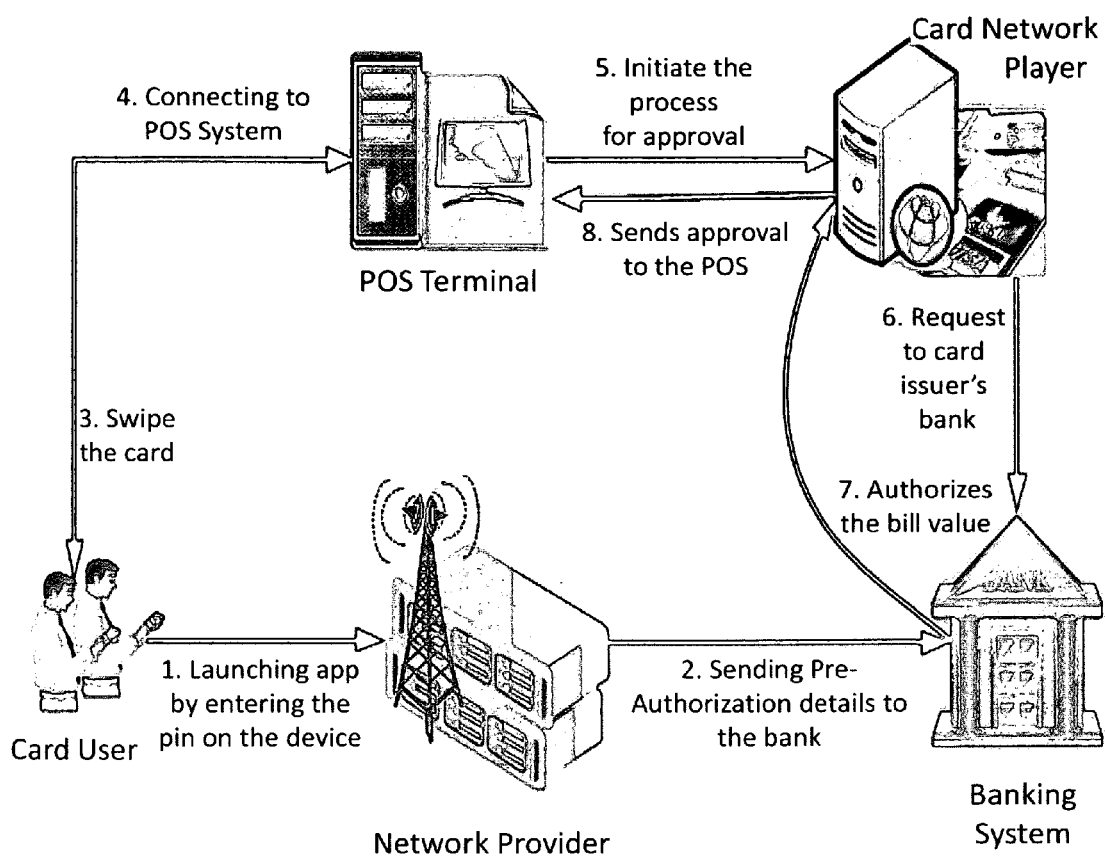
FIG. 3 illustrates an advanced authorization system.

FIG. 3 illustrates an embodiment, useful when an authorized user of record may be unable to communicate with the intermediary at the specific time when the transaction is to take place. In the Pre-Authorization approach, the card holder authorizes the payment for a specific duration before the physical transaction is made. As shown in FIG. 3, the following components are used and the following flow of information between these stakeholders takes place for the PreAuthorization approach.

Figure 4:
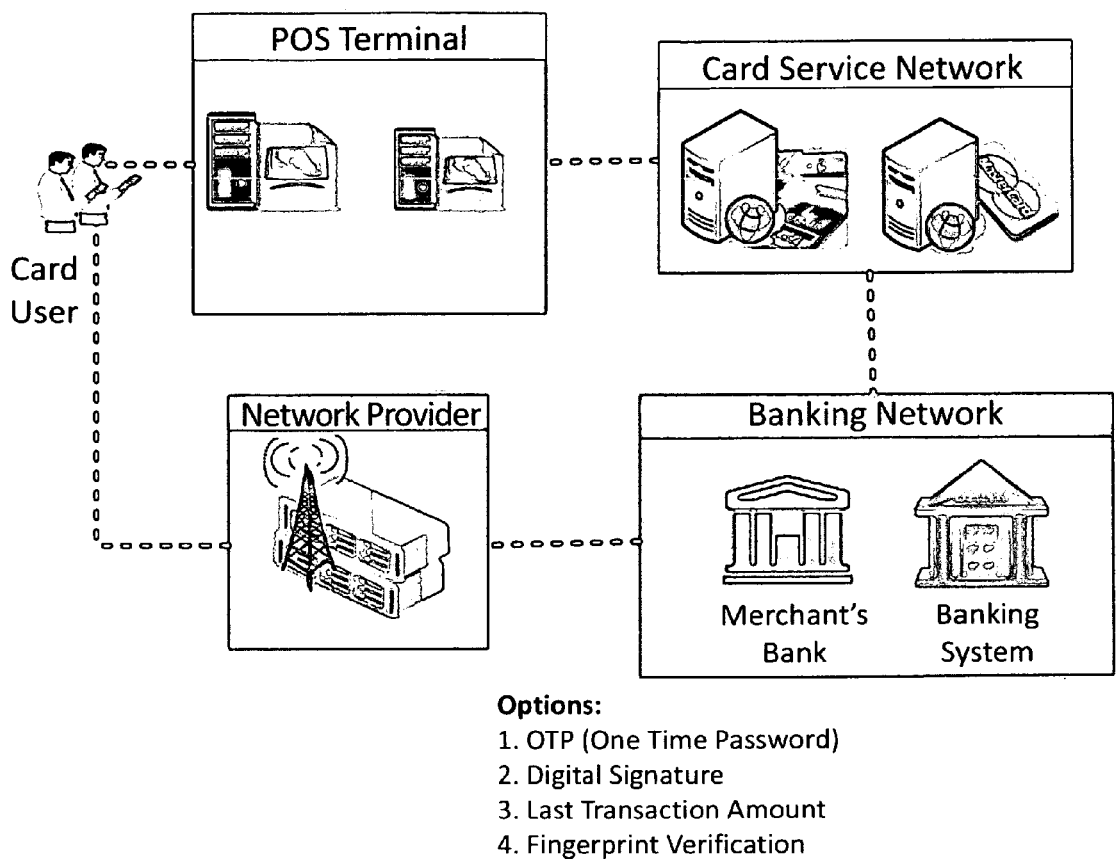
FIG. 4 illustrates a POS authorization system.

FIG. 4 illustrates an embodiment where authentication takes place at the point of sale and time of transaction. In this situation, the At-Authorization approach, the card holder authorizes the payment just before the Credit Card issuer bank is contacted to authorize the payment.

This At-Authorization approach can be implemented at both, Card Service Network and Banking Network level. The POC implements the At-Authorization at Banking Network level.

The diagram shows the key stakeholders and flow of information between these stakeholders for the At-Authorization approach.

Figure 5:
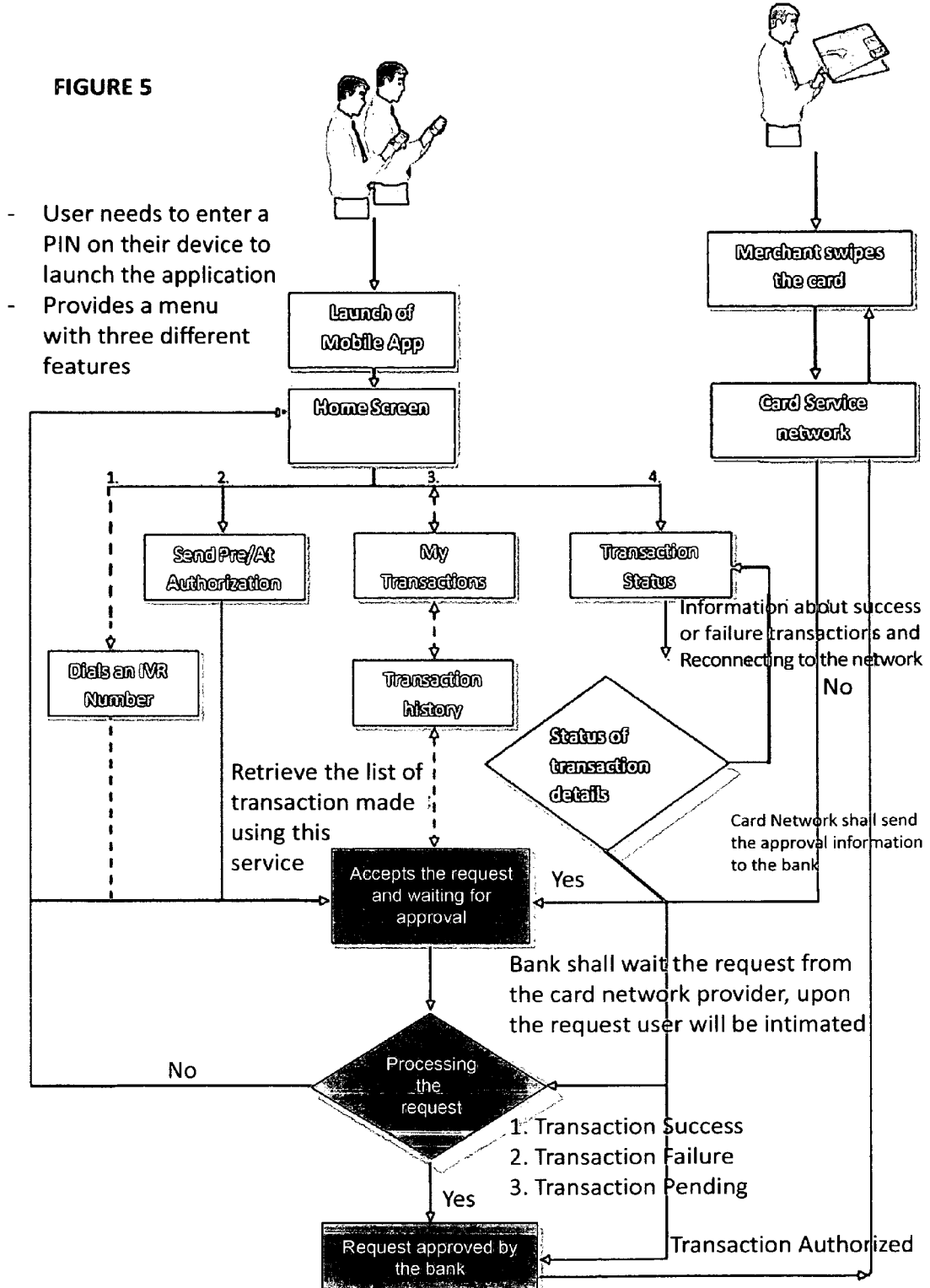
FIGS. 5 and 6 illustrate the general flow of data for a generic transaction, including authorization data flow.
Figure 6:
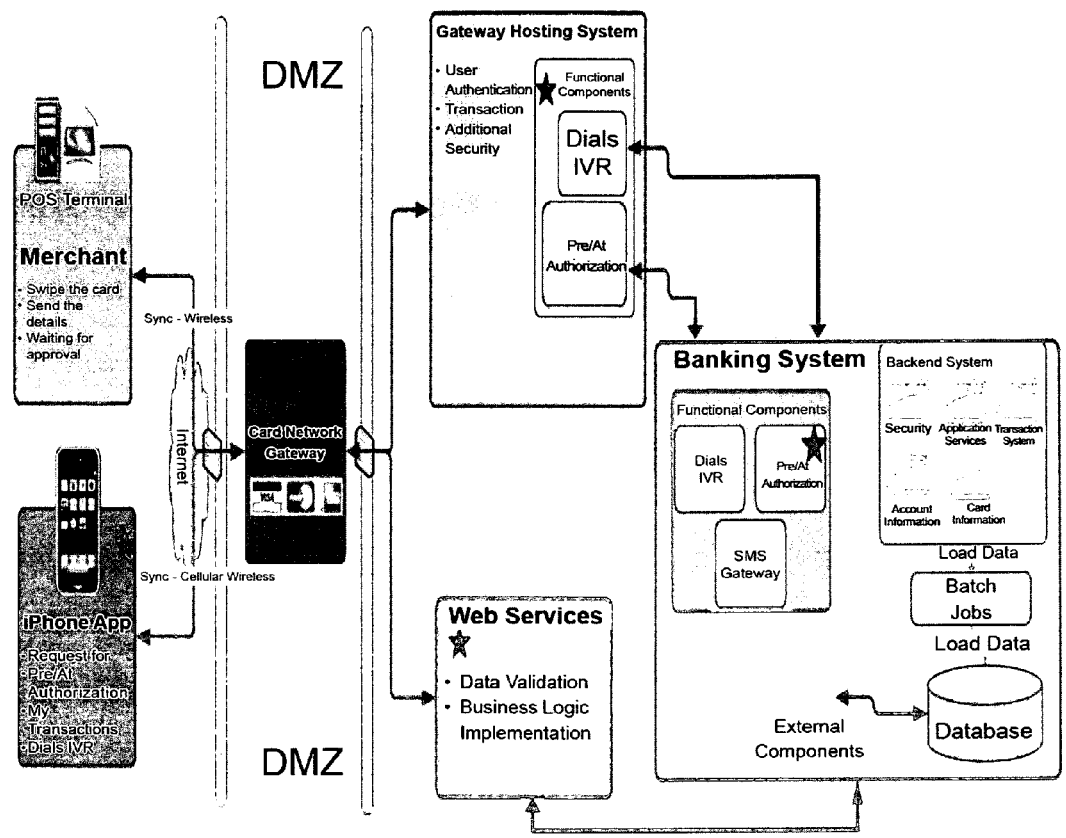

FIGS. 5 and 6 illustrate the general flow of data for a generic transaction, including authorization data flow.

Figure 7:
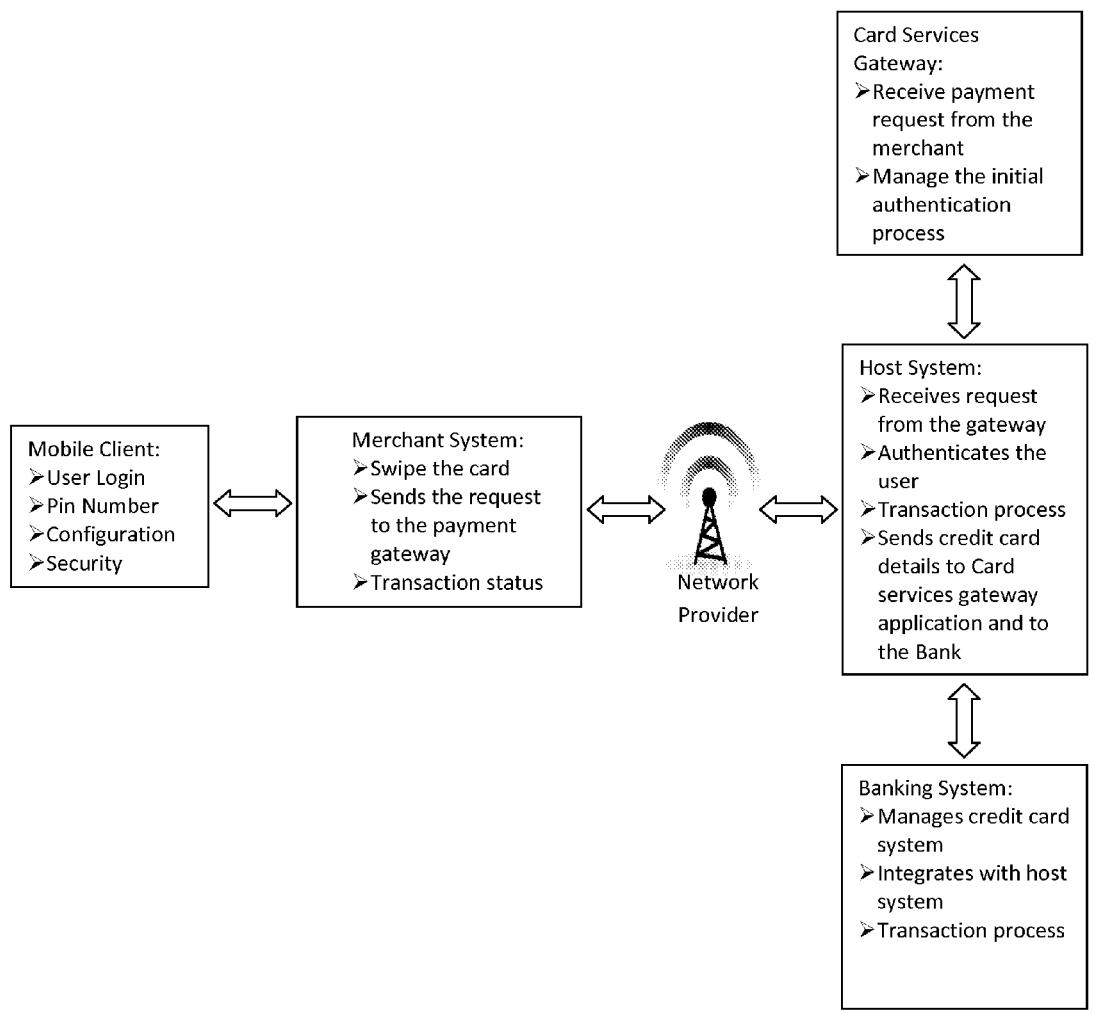
FIG. 7 illustrates an implementation of the invention.

FIG. 7 shows how the entire system would function to authorize and verify a transaction.

PROOF OF CONCEPT

A proof of concept prototype could be constructed as follows.

In a preferred embodiment using an Apple iPhone™, the POC system would have 4 main components iPhone POC. This application is used by the credit card user for pre-authorization, At authorization and view transactions and includes the following screens
  a. Splash Screen
  b. Home Screen
  c. Authorization Screen
    i. At Authorization pop up
  d. About Screen
  e. My Transaction Screen
    i. Transaction History pop up
  f. Transaction Status pop up
2. Simulated POS
This simulated model shall be responsible to simulate the card transaction and shall hold the information like card number, amount, date and status
3. Simulated CNS
CNS is a non UI service that acts as an bridge between POS and BS to transfer the information, since this is POC, CNS does not have any major responsibility associated with it except to transfer the transaction data between POS and BS
4. Simulated BS
BS is responsible to show the information received from POS and act on the transaction and return the response back to credit card user. BS involves itself in following type of requests
  Pre Authorization
  This type of request is sent by credit card user prior to the transaction, typically a card swipe at POS. As soon as transaction is done by credit card user, BS shall compare the Pre Authorization data and the original transaction data to authorize or decline the transaction and send the response back to iPhone application.
  At Authorization
  At Authorization is similar to Pre Authorization except that BS shall not have any prior information of transaction. In order to simulate the At Authorization effectively, a server check shall be sent from iPhone application and BS responds back with At authorization information. iPhone application shall ping the BS every minute, once the user launches the application in order to get the appropriate response back to the client.

A prototype has been constructed with the following characteristics:
  Pre Authorization/At Authorization
    a. User shall launch the app and successfully pre authorize the transaction for specific amount and credit card
    b. Bank sends an At authorization request to User
    c. User receives successful authorization message
    d. User receives failed/declined authorization message (BS sends failed/declined response)
      i. due to insufficient funds
      ii. due to invalid data (like credit card number not matching with records etc.)
      iii. due to network failure
      iv. due to time out (both for pre and at authorization)
    e. User receives transaction pending message
      i. due to credit card service and bank link wait
      ii. due to bank response wait
    b. User sends a pre authorization for specific amount range, however in case bank receives payment exceeding or less than the amount range mentioned in pre authorization then bank sends an At authorization request to user for authorizing the payment
    c Card swiped twice for same amount, where in bank system can discard one transaction directly
4. Login
  a. User specifies proper username and password
  b. User specifies wrong username/password
2. IVR
  a. User enters correct information
  b. User enters wrong credit card number
  c. User enters wrong amount
A Home Screen has the following characteristics
This class shall be representing Home screen of the application.
This class shall have following four options available for the user.
  1. IVR screen
  2. Pre/At Authorization screen
  3. About
  4. My Transactions
Functions called in this Class
  (void)loadView( )
  (void)loadDialAnIVRScreen( )
  (void)loadPreAtAuthorizationScreen( )
  (void)loadMyTransactionsScreen( )
  (void)dcalloc( )
An IVR Popup has the following characteristics
This class shall be representing Dial an IVR pop up of the application.
This class shall have one Field to input the credit card number, amount and a End call button.
Functions called in this Class
  (void)loadView( )
  (void)dialAnIVRNumber( )
  (void)dealloc( )
An Authorization Screen has the following characteristics
This class shall be representing Authorization screen of the application.
This class shall have a slider to select the credit range and a picker field to select the available credit cards. User shall be provided Authorize and Reset buttons.
Functions called in this Class
  (void)loadView( )
  (void)resetControlValues( )
  (void)placePreAuthorizationRequest( )
  (void)dealloc( )

An At Authorization Pop up has the following characteristics

This class shall be representing Transaction Authorization pop up for the transaction. Using which user can accept or decline the transaction.

Functions called in this Class
(void) initialize( )
(void) acceptTransaction( )
(void) declineTransaction( )
(void) dealloc( )

A My Transactions Screen has the following characteristics

This class shall be representing My Transaction screen of the application.

This screen shall show all transactions of the user.

Functions called in this Class
(void)loadView( )
(void)showSelectedTransactionHistory( )
(void)dealloc( )

A Transaction History Popup has the following characteristics

This class shall be representing Transaction History screen of the application.

This screen shall show the transaction detail of the selected transaction.

Functions called in this Class
(void) initialize( )
(void) getTransactionDetail( )
(void) dealloc( )

An About Screen has the following characteristics
Functionality of the Class

This class shall be representing My Transaction screen of the application.

This screen shall show all transactions of the user.

Functions called in this Class
(void)loadView( )
(void)showAboutInfo( )
(void)dealloc( )

A Transaction Status pop up has the following characteristics
Functionality of the Class This class shall be representing Transaction status of the transaction.

Functions called in this Class
(void) initialize( )
(void) showTransactionStatusPopUp( )
(void) dealloc( )

A Log-in Screen has the following characteristics

This class shall be the entry-point of "BS" application and shall be responsible for validating the supplied credentials. On successful validation gives access to BS screen.

Functions called in this Class
(string)validate( )

A POS Screen has the following characteristics

This class shall be the entry-point for POS terminal which captures card number, transaction amount and validates the data for transaction process.

Functions called in this Class
(void) caputureData( )
(dataset) updateBS( )
(string) invokeService( )
(dataset) displayData( )

A BS Screen has the following characteristics

This class shall authorize or decline the transaction made by the user at POS terminal.

Functions called in this Class
(void) sendResponse( )
(string) recieveRequest( )
(void) validateData( )

A CNS Service has the following characteristics

This is the web method act as a middle tier runs in background which helps to interact POS with BS.

Functions called in this Class
(void) sendBS( )
(string) recieveBS( )

There are two types of interfaces:
Internal Interface
External Interface

Following are the internal interface present in "Simtech POC" application. This interface holds the static data for application like images, html contents (if any) and information about application.

This interface provides the GUI (Graphical User Interface) for the application. Through this interface user can interact with the application. It shall also provide the navigation between different features of the application.

Program/Method Reference:

initializeTheView: This method creates the view and its interface elements (if any).

loadView: This method loads the view with initialized interface elements.

In and out parameters:
In Parameters:
category_details: contains the details of selected tab/screen/button.
category_name: contains the name of the selected tab/screen/button.
Out Parameters:
view: contains the UI elements of the selected tab/screen/button details.

Runtime behaviour iPhone app shall communicate with BS server with the help of SOAP web services for pre and at authorizations.

iPhone Screens 2.1. Splash Screen 2.1.1 This screen shall be shown on each and every launch of application and after 3 seconds login screen shall be displayed automatically.

Login Screen 2.1.2 Login screen shall appear at every launch of application prompting user to input username and password to log-in to the application. For proof of concept, Since POC does not have the registration concept a hard-coded username 'Simtech' and password 'Hadrian' combination shall be maintained for authentication. iPhone shall receives the credit card numbers associated with logged in user from BS which shall be displayed in Authorization screen for Pre Authorization process.

Home Screen 2.1.3. Home screen shall be the main screen of the application, shall contain 4 different options IVR, Authorization, My Transactions and About.

Dial IVR 2.1.4. IVR shall simulate a call process along with edit field to enter the credit card number and amount. Call pop up shall stay on screen for 10 seconds. There shall be a end call button on the call pop up. If user clicks on end call button before 10 seconds the request process shall be terminated and a failure message shall be shown otherwise a successful message shall be shown.

Authorization Screen

This screen shall take care of the main concept of iPhone application, user shall be able to select the amount range and select the credit card from the picker control for sending a pre authorization request to BS.

My Transactions Screen

This screen shall show all the transactions that have been done by user in form of list, once user selects particular transaction from the list, all the details shall be shown in a pop-up related to selected transaction like Credit card number
Amount range if pre authorization
Actual amount
Date and Time
POS identification
Final status
About Screen 8.1.1. This screen shall display description about iPhone POC and its version.

Transaction History/At Authorization Pop up 8.1.2. History pop up shall take care of showing the selected transaction details of user and authorization pop up shall allow the user to authorize or decline particular transaction, especially At Authorization pulled from BS.

Simulation Model Screens 8.2. Log-in screen 8.2.1. This screen shall be a log-in point for BS screen. Once user logs-in successfully shall be shown a BS grid user interface with transaction information.

Simulated POS 8.2.2. This screen shall contain two parts, once shall show an animation image representing a POS terminal where the card transaction happens along with an on screen key pad to enter the amount and execute the transaction. Once the transaction is executed user shall be shown a grid UI with information like credit card number, amount, date and status.

Simulate BS 8.2.3. BS system shall be a grid UI reflecting all the information sent from POS and additional components like user name. All the transaction authorizations shall be automated process showing the animated status accordingly.

Status Header 8.2.4. This header shall be representing where the request is currently residing in form of a status bar, so that user can easily get to know the flow of the request.

Test Scenarios

A preferred embodiment was tested using the following components: iPhone 4, Dedicated Windows server and hosting space for Simulation model, .Net framework 2.0, Ajax extension 1.0, IrS 5.0 or above, and included the following:

Hadrian app: an IPhone-4 application which communicated with the BS and allows a user to raise Pre-authorization for a specific amount for all the credit cards associated with specific user name and also receive authorization request from BS for the actual transactions happening at the POS. Based on user authorize or declining response the transaction shall be processed by the BS and update to POS.

Figure 8:
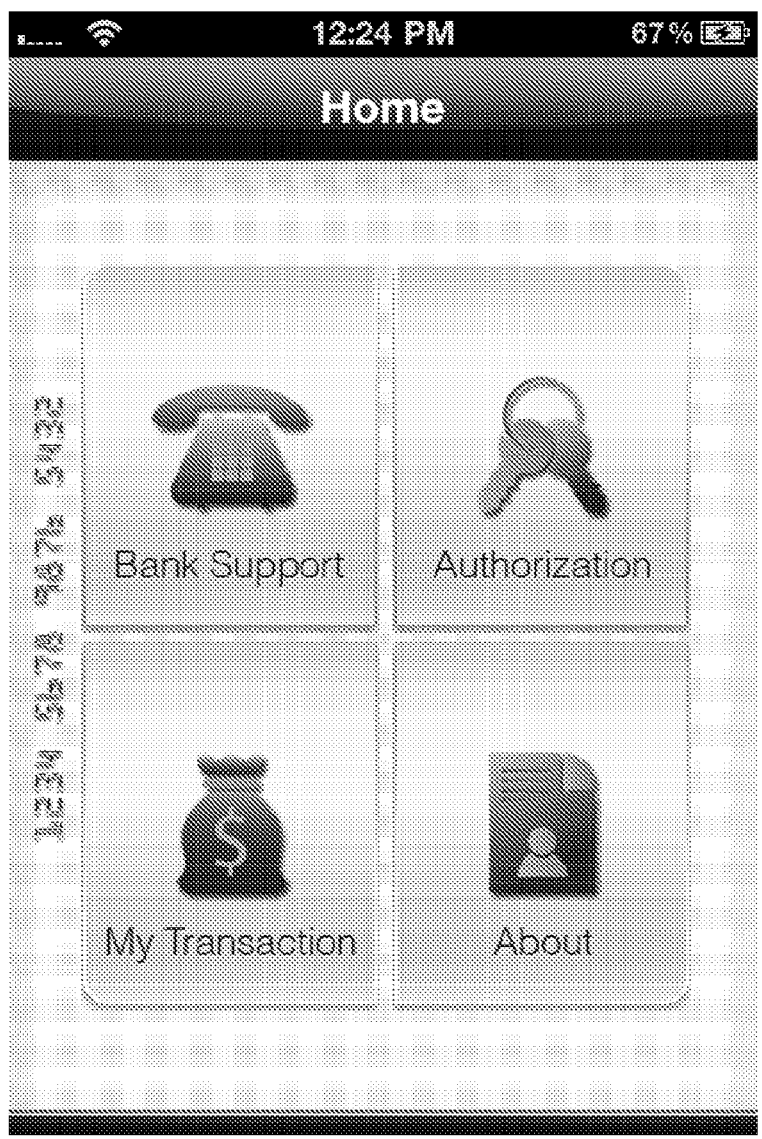
Figure 9:
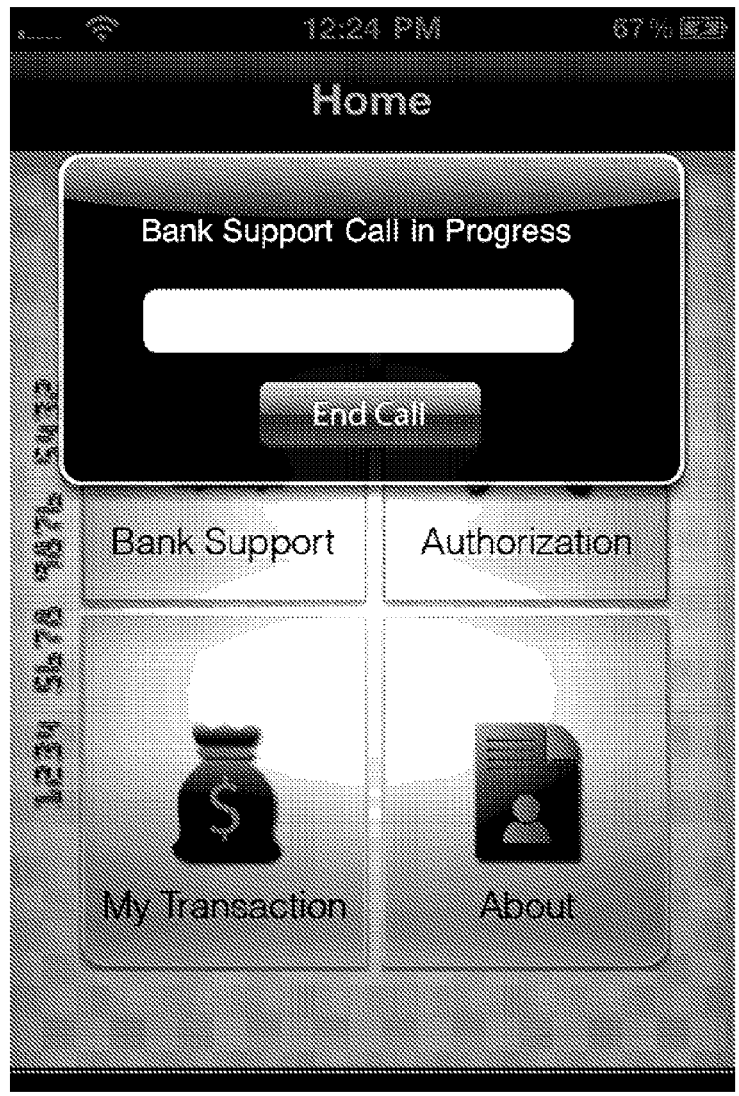
Figure 10:
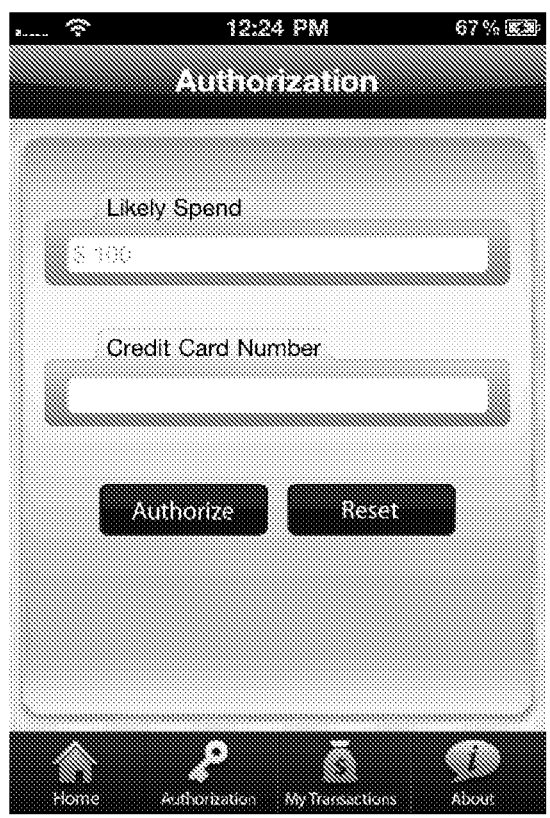
Figure 11:
Figure 12:
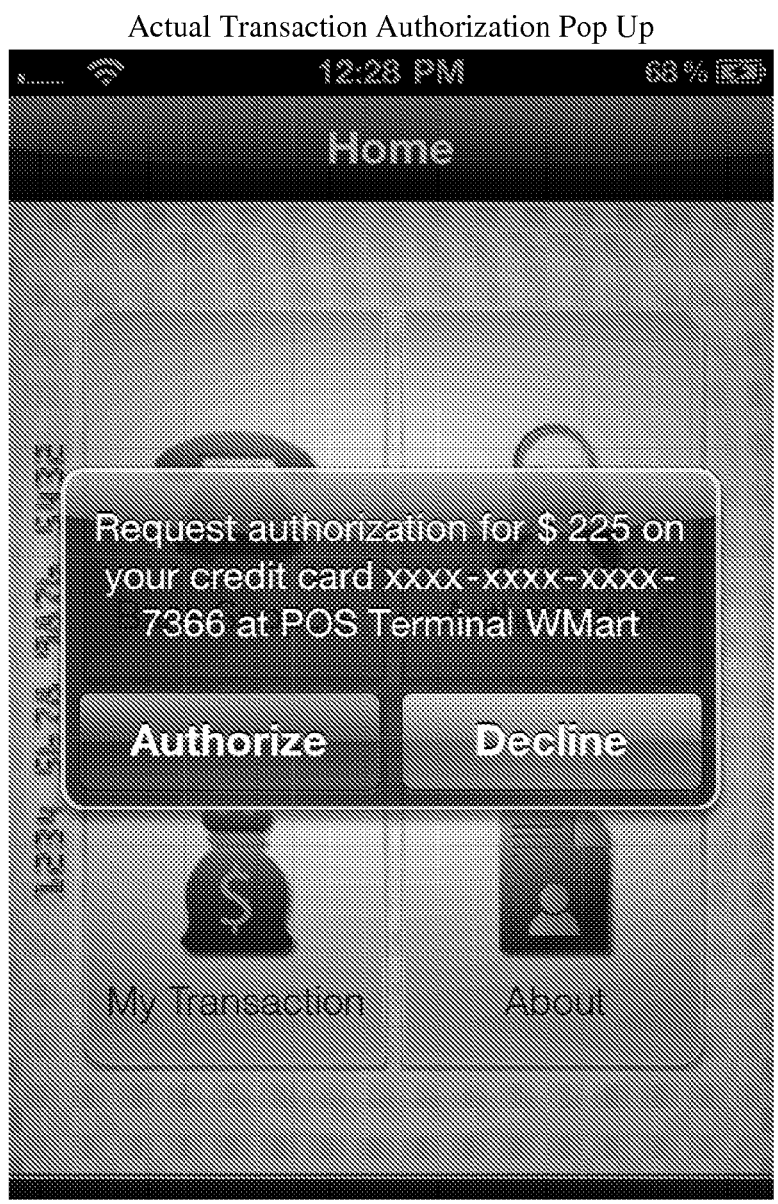
Figure 13:
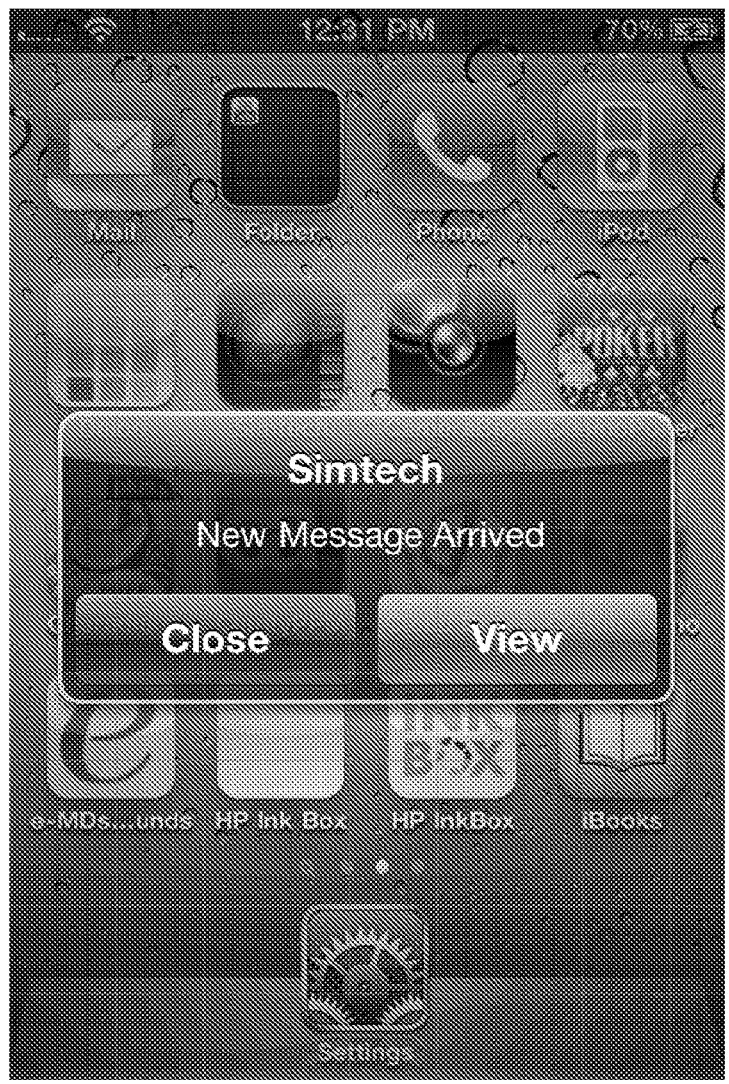
Figure 15:
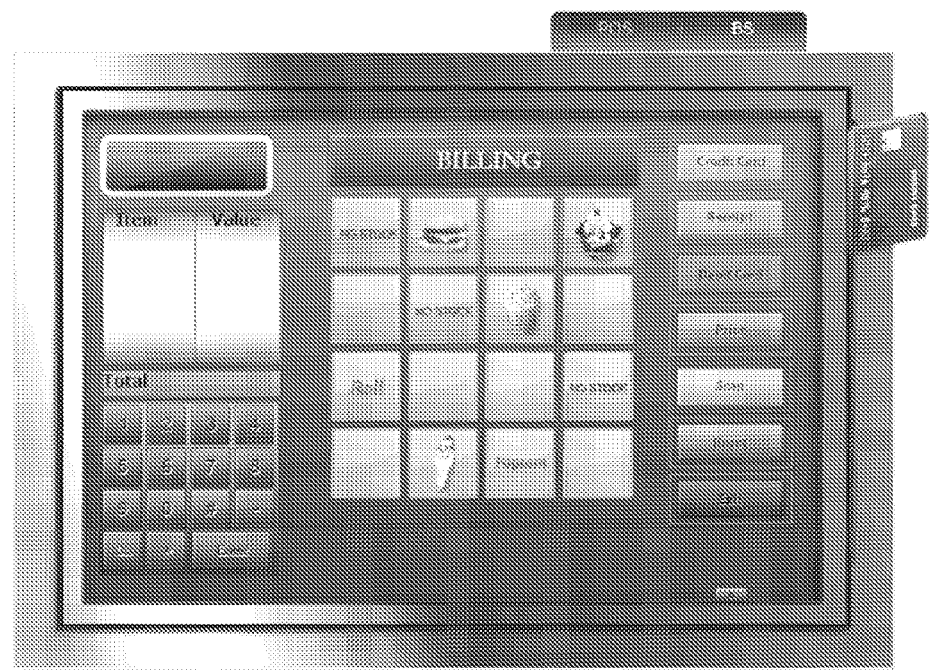
Figure 16:
Figure 17:
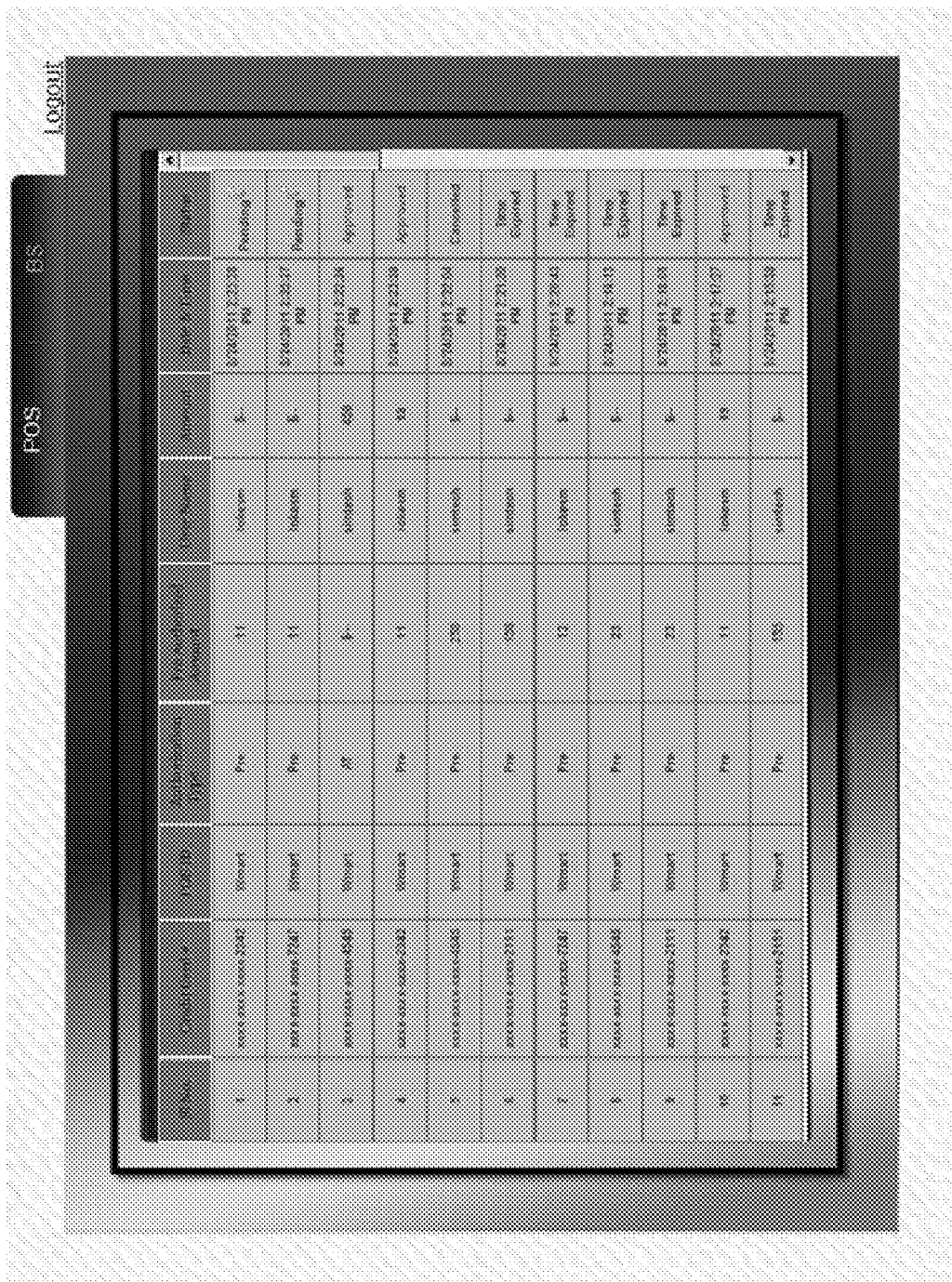
Figure 18:
Figure 19:
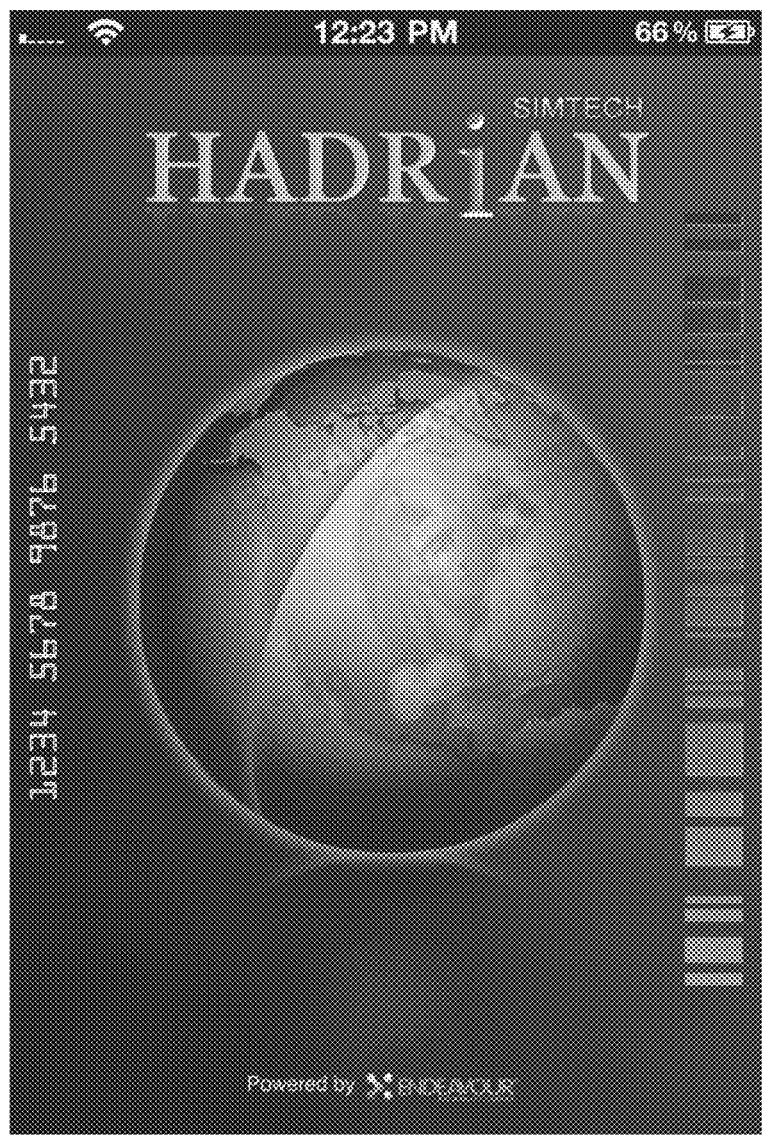

The i-phone application had the following screens: Splash screen (an example is shown in FIG. 19), Login screen (an example is shown in FIG. 18), Home screen (an example is shown in FIG. 8), bank Support screen (an example is shown in FIG. 9), authorization screen and card selection (an example is shown in FIG. 10), pre-authorization popup (an example is shown in FIG. 11), Actual Transaction authorization popup (an example is shown in FIG. 12), APNS popup (an example is shown in FIG. 13), and My transactions screen and transaction details (an example is shown in FIGS. 14A-14B).

The system was tested using a simulated POS terminal to simulate a typical POS terminal where the billing happens and a transaction request sent to respective eNS and BS once the credit card is swiped and a Simulated eNS, which is a non UI simulated eNS which simply shall act as a bridge between POS and BS and a Simulated BS to simulate a bank system to show all the transactions and their status.

The capabilities and functioning of the invention are further illustrated in the following scenarios which were tested:

Scenario 1

1. User launch the application on the iPhone
2. Types proper usemame and password in the Login screen
3. Home screen is shown with available options based on user validation and credit cards associated with user
4. Selects Authorization screen
5. Enters likely spend amount
6. Selects the credit cards from the list associated
7. Clicks Authorize button to send the pre authorization request to BS
8. Receives acknowledgement from BS
9. User performs transaction at POS with a credit card on which pre authorization request is placed
10. If actual transaction is with in the limits of pre Auth request+$50, bank shall check and authorize the request directly
11. My Transactions screen shall be updated accordingly in Hadrian app Scenario 2

1. User launch the application on the iPhone
2. Types proper usemame and password in the Login screen
3. Home screen is shown with available options based on user validation and credit cards associated with user
4. Selects Authorization screen
5. Enters likely spend amount
6. Selects the credit cards from the list associated
7. Clicks Authorize button to send the pre authorization request to 15S
8. Receives acknowledgement from BS
9. User performs transaction at POS with a credit card on which pre authorization request is placed
to. r f actual transaction is more than the limit of pre auth request+$50 then the transaction shall be cancelled by BS and new AT request is sent to user
11. User receives AT pop up and can wither Authorize or decline the transaction
12. BS shall act accordingly based on user response
13. Sends appropriate response back to POS 3.6. Scenario 3

1. User launch the application on the iPhone
2. Types proper usemame and password in the Login screen
3. Home screen is shown with available options based on user validation and credit cards associated with user
4. Selects Authorization screen
5. Enters likely spend amount
6. Selects the credit cards from the list associated
7. Clicks Authorize button to send the pre authorization request to BS
8. Closes the app by clicking in device home button
9. User performs transaction at POS with a credit card on which pre authorization request is placed
10. If actual transaction is with in the limits of pre Auth request+$50, bank shall check and initiate APNS notification
11. User receives the notification when clicked on 'View' app launches and user inputs proper user name and password 12. Receives Preauthorization pop up 13. BS shall process the transaction and send the response to POS 14. My Transactions screen shall be updated accordingly in Hadrian app Scenario 4

1. User launch the application on the iPhone

2. Types proper usemame and password in the Login screen

3. Home screen is shown with available options based on user validation and credit cards associated with user 4. Selects. Authorization screen 5. Enters likely spend amount 6. Selects the credit cards from the list as(sciated 7. Clicks Authorize button to send the pre authorization request to BS 8. Closes the app by clicking in device home button 9. User performs transaction at POS with a credit card on which pre authorization request is placed 10. If actual transaction is above the limit of pre Auth request+S50, BS shall cancel the transaction, initiate AT request and sends APNS notitication 11. User receives the APNS notification with View and Close buttons, when clicked on 'View' app launches and user inputs proper user name and password. If clicked on 'Close' nothing happens and BS shall wait for specified time and cancel the transaction 12. Receives AT authorization pop up 13. BS shall process the transaction based on user response and send the response to POS 14. My Transactions screen shall be updated accordingly in Hadrian app Scenario 5

1. User launch the application on the iPhone

2. Types proper usemame and password in the Login screen

3. Home screen is shown with available options based on user validation and credit cards associated with user 4. User performs actual transaction at POS with a credit card 5. BS shall initiate XI' request and sends APNS notification 6. User receives the AT pop up and shall authorize or decline the request 7. BS shall process the transaction based on Llser response and send the response to POS 8. My Transactions screen shall be updated accordingly in f-fadrian app Scenario 6

1. User docs not launch the app

2. User performs actual transaction at POS with a credit card

3. BS shall initiate AT request and sends APNS notification

4. User receives APNS notification pop up with 'View' and 'Close' options

5. When clicked on View, application launches and user types proper username and password. If clicked on 'Close' button nothing happens and after some time transaction shall be cancelled by BS and updates to POS 6. Receives AT transaction pop where user can authorize or decline the transaction 7. BS shall receive the response and update POS accordingly 8. My Transactions screen shall be updated accordingly in Hadrian app Scenario 7

1. User launch the application on the iPhone

2. Types proper username and password in the Login screen

3. Home screen is shown with available options based on user validation and credit cards associated with user 4. Selects Authorization screen 5. Enters likely spend amount 6. Selects the credit cards from the list associated 7. Clicks Authorize button to send the pre authorization request to BS 8. Receives acknowledgement from BS 9. Performs actual transaction at POS 10. If actual transaction is more than the limit of pre auth request+$50 then the transaction shall be cancelled by BS and new AT request is sent to user 11. User enters a dead zone where there is no internet available or does not respond to the transaction request sent by BS 12. BS shall wait for 2 minutes for user response and if not received shall send a pass code request to POS terminal 13. User should enter the credit card pin at the PUS terminal manually to authorize the transaction 14. BS shall act accordingly based on user response 15. Sends appropriate response back to POS Scenario 8

1. User launches the app

2. Types proper username and password

3. Finds Bank support and authorization buttons in active lin home screen

4. This is because either user is not associated with any credit cards or credit cards expired 5. User shall be able to only see the My transactions page Scenario 9

1. User launch the application on the iPhone

2. Types proper username and password in the Login screen

3. Home screen is shown with available options based on user validation and credit cards associated with user 4. Selects Authorization screen 5. Enters likely spend amount 6. Selects the credit cards from the list associated 7. Clicks Authorize button to send the pre authorization request to BS 8. If insufficient funds on the card then BS shall send back appropriate response and cancels the request placed Scenario 10

1. User launch the application on the iPhone

2. Types proper username and password in the Login screen

3. Home screen is shown with available options based on user validation and credit cards associated with user 4. Selects Authorization screen 5. Enters likely spend amount 6. Selects the credit cards from the list associated 7. Clicks Authorize button to send the pre authorization request to BS 8. Receives acknowledgement from BS 9. Performs actual transaction at POS 10. If actual transaction is more than the available credit limit on the card then BS shall cancel the transaction 11. Update user and POS accordingly Thus, there has been described a novel solution for reducing the risk of fraud in point of sale credit card transactions by providing independently-routed verification by communication between the authorized user of the credit card and the issuer of the credit card through a trusted intermediary, that has a number of novel features, and a manner of making and using the invention.

While a specific embodiment of the invention has been shown and described in detail to illustrate the application of the principles of the invention, it will be understood that the invention may be embodied otherwise without departing from such principles and that various modifications, alternate constructions, and equivalents will occur to those skilled in the art given the benefit of this disclosure. Thus, the invention is not limited to the specific embodiment described herein.

What is claimed is:

1. A system for secure verification of point of sale credit card transactions to reduce fraudulent transactions, comprising:
    a third party, independent backend communications module;
    a merchant point of sale network in communication with the backend communications module, adapted to request authorization of a transaction from a user's bank and receive confirmation or denial of authorization of the transaction from the user's bank;
    a mobile telephone in communication with the backend communications module which has been registered with a verifying agency as belonging to said user;
    a bank network in communication with the backend communications module, adapted to receive requests for authorization of transactions, determine if the user authorizes a transaction, and confirm or deny the transaction based on the user's authorization; and
    an application running on said mobile telephone adapted to pre-authorize transactions and authorize or deny a currently pending transaction;
    wherein there is no direct communication between the merchant network, the mobile telephone, and the bank network.

2. A method for verifying the authenticity of a request for authorization of payment in point of sale credit card transactions to reduce fraudulent transactions, comprising, on a third party, independent backend communications module:
    receiving a request from a merchant point of sale system for authorization of a transaction;
    determining if the transaction has been pre-authorized by a user;
    confirming the transaction if the transaction has been pre-authorized;
    sending a signal requesting confirmation or denial of authorization to a mobile device of the user if the transaction has not been pre-authorized;
    receiving a confirmation or denial of authorization from the user; and
    responding to said merchant with an approval or a denial of authorization based on the user's confirmation or denial of authorization;
    wherein there is no direct communication between the merchant point of sale system, the mobile device, and a bank.

3. The system of claim 1, wherein the user is presented with the option of pre-authorizing transactions on multiple credit cards.

4. The system of claim 3, wherein the user is presented with the option of pre-authorizing different amounts for each credit card.

5. The system of claim 1, wherein the authorization or pre-authorization is alternately completed via an interactive voice response (IVR) system.

6. The system of claim 1, wherein the pre-authorization exists for a period of time.

7. The system of claim 6, wherein the period of time is chosen by the user.

8. The method of claim 2, further comprising presenting the user with the option of pre-authorizing transactions on multiple credit cards.

9. The method of claim 8, further comprising presenting the user with the option of pre-authorizing different amounts for each credit card.

10. The method of claim 2, wherein the authorization or pre-authorization is alternately completed via an interactive voice response (IVR) system.

11. The method of claim 2, wherein the pre-authorization exists for a period of time.

12. The method of claim 11, wherein the period of time is chosen by the user.

13. A method for authorizing payments in point of sale credit card transactions to reduce fraudulent transactions, comprising:
    creating a first user interface on a mobile device wherein a user is presented with the option of pre-authorizing a transaction;
    creating a second user interface on a mobile device wherein the user is presented with the option of confirming or denying a currently pending transaction;
    transmitting at least one of the pre-authorization, the confirmation, or the denial of the transaction to a third party, independent intermediary for dissemination to a merchant point of sale system;
    wherein there is no direct communication between the merchant point of sale system, the mobile device, and a bank.

14. The method of claim 13, further comprising presenting the user with the option of pre-authorizing transactions on multiple credit cards.

15. The method of claim 14, further comprising presenting the user with the option of pre-authorizing different amounts for each credit card.

16. The method of claim 13, wherein the pre-authorization exists for a period of time.

17. The method of claim 16, wherein the period of time is chosen by the user.

* * * * *